(12) United States Patent
Shih et al.

(10) Patent No.: US 6,927,828 B2
(45) Date of Patent: Aug. 9, 2005

(54) LIQUID CRYSTAL DISPLAY HAVING BIASED BENDING VERTICAL ALIGNMENT

(75) Inventors: Po-Sheng Shih, Tao Yuan Hsien (TW); Seok-Lyul Lee, Tao Yuan Hsien (TW); Kei-Hsiung Yang, Tao Yuan Hsien (TW); Kuo-Tzune Chen, Tao Yuan Hsien (TW); Wei-Hsin Wang, Tao Yuan Hsien (TW); Sheng-Hsien Lin, Tao Yuan Hsien (TW)

(73) Assignee: Hannstar Display Corporation, Hsien (TW)

( * ) Notice: Subject to any disclaimer, the term of this patent is extended or adjusted under 35 U.S.C. 154(b) by 0 days.

(21) Appl. No.: 10/813,313

(22) Filed: Mar. 30, 2004

(65) Prior Publication Data

US 2004/0183983 A1 Sep. 23, 2004

Related U.S. Application Data

(63) Continuation-in-part of application No. 10/154,716, filed on May 24, 2002, now Pat. No. 6,803,981.

(51) Int. Cl.⁷ .................... G02F 1/1343; G02F 1/1337; G09G 3/36
(52) U.S. Cl. .................. 349/143; 349/129; 345/87; 345/103
(58) Field of Search ................. 345/87, 94–96, 345/103; 349/123, 143, 129

(56) References Cited

U.S. PATENT DOCUMENTS

| | | | | |
|---|---|---|---|---|
| 5,136,407 | A | | 8/1992 | Clerc .................. 349/146 |
| 5,886,762 | A | | 3/1999 | Lee et al. .............. 349/141 |
| 5,953,092 | A | * | 9/1999 | Sung et al. ............ 349/143 |
| 6,115,093 | A | * | 9/2000 | Murai et al. ........... 349/129 |
| 6,157,428 | A | | 12/2000 | Koma ................. 349/138 |
| 6,177,976 | B1 | * | 1/2001 | Murai et al. ........... 349/191 |
| 6,466,288 | B1 | * | 10/2002 | Rho .................. 349/141 |
| 2003/0107695 | A1 | | 6/2003 | Kubo et al. |
| 2003/0112397 | A1 | * | 6/2003 | Lee .................. 349/129 |

* cited by examiner

Primary Examiner—Tarifur R. Chowdhury
(74) Attorney, Agent, or Firm—Volpe and Koenig, P.C.

(57) ABSTRACT

A liquid crystal display includes a first substrate including a first electrode; a second substrate including thereon a second electrode having at least one elongate hole having a longitudinal direction and facing to the first electrode; a third electrode positioned under the at least one hole and between the second electrode and the second substrate; and a liquid crystal layer comprising a plurality of liquid crystal molecules and interposed between the first substrate and the second substrate. The third electrode has a bias voltage being two volts higher than a pixel voltage of the sub-electrode.

15 Claims, 15 Drawing Sheets

LIQUID CRYSTAL DISPLAY HAVING BIASED BENDING VERTICAL ALIGNMENT

FIELD OF THE INVENTION

The present invention relates to a liquid crystal display, and more particularly, to a liquid crystal display having biased bending vertical alignment.

BACKGROUND OF THE INVENTION

Figure 1:
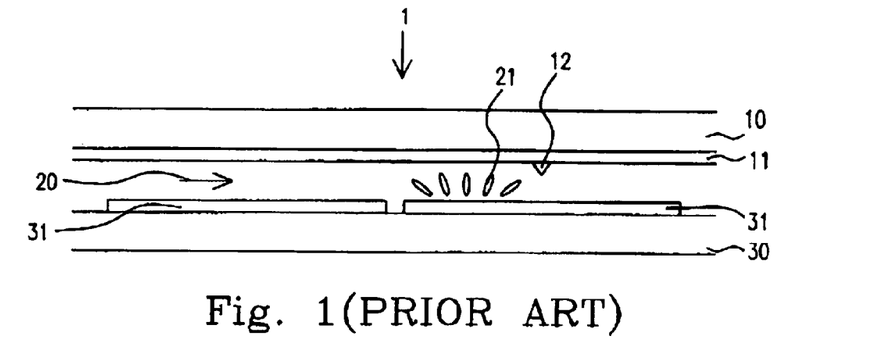
FIG. 1 is a cross-sectional view of a conventional liquid crystal display.

In the conventional liquid display 1 as shown in FIG. 1, the first substrate 10 has a first electrode 11, the second substrate 30 has a second electrode 31, and a liquid crystal layer 20 is disposed between the first electrode 11 and the second electrode 31. The protrusion 12 disposed on the first electrode 11 can divide each pixel area into a plurality of domains. So, each liquid crystal molecules 21 is not vertical but has an angle to the first substrate 10, called multi-domain vertical alignment (MVA). As such, the view angle of a user is increased.

However, the manufacture of the protrusion 12 is difficult so the cost of the conventional display 1 is very high and is easy to malfunction.

Figure 21:
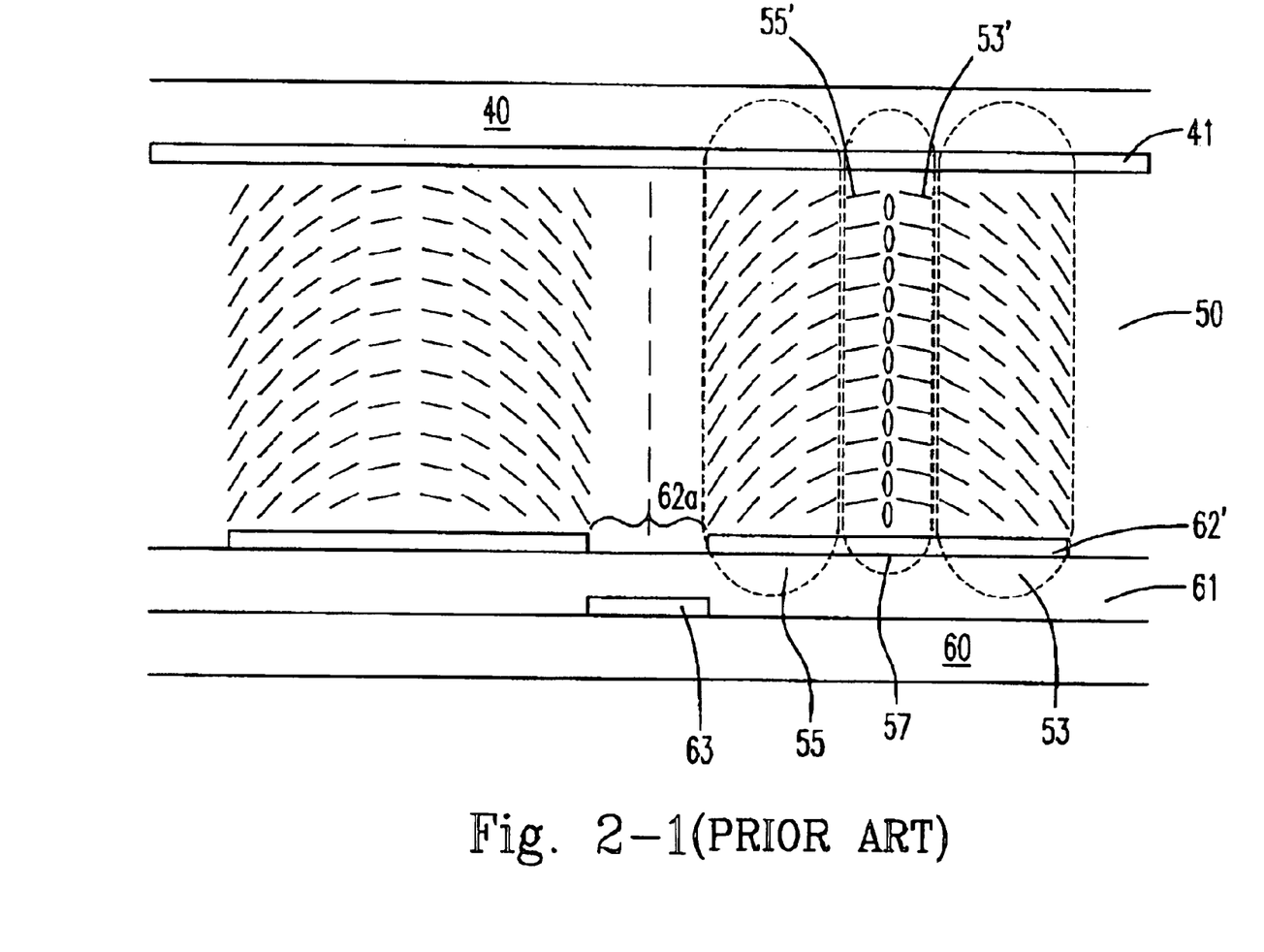
Figure 22:
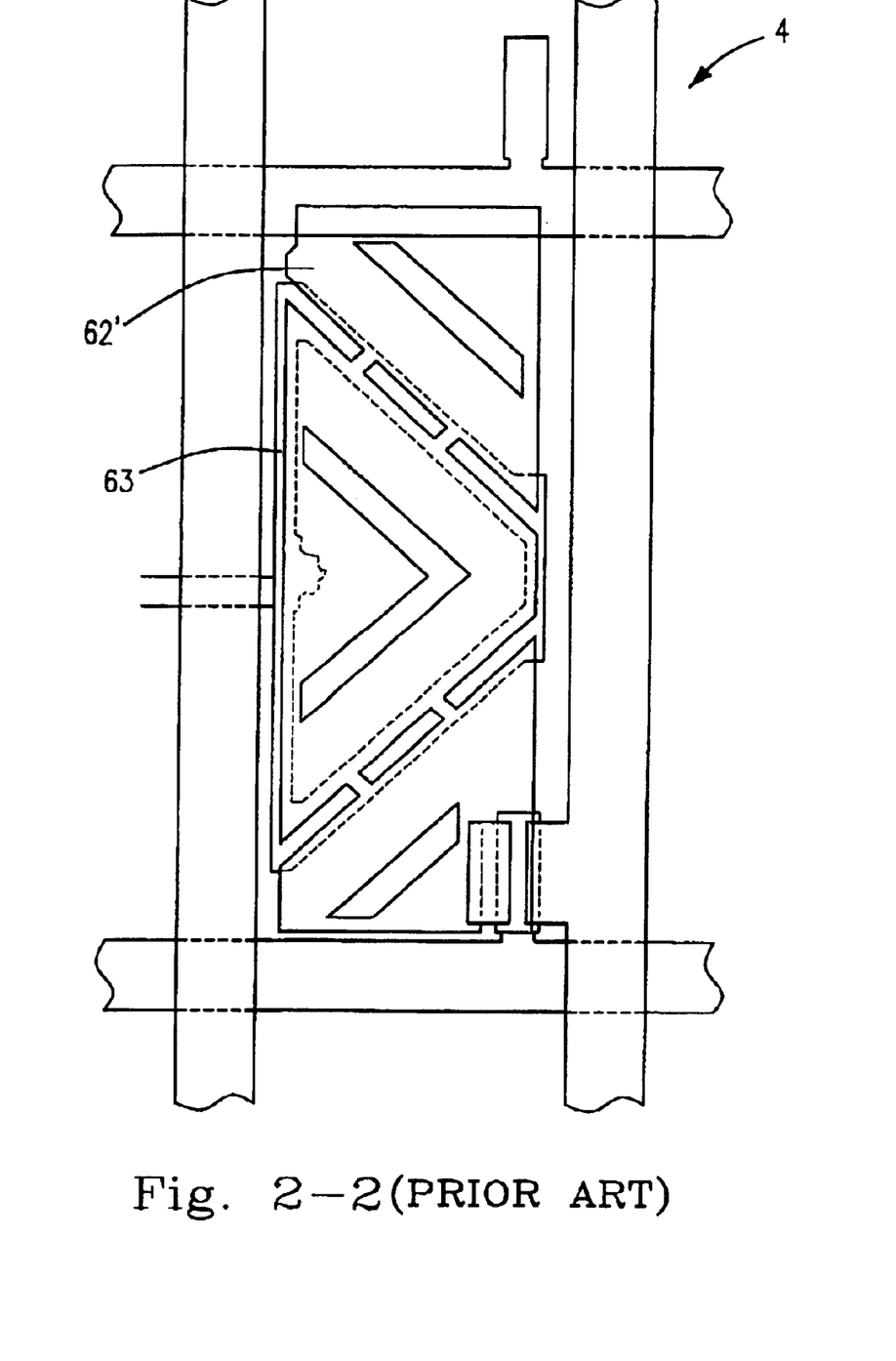

The other conventional liquid crystal display 4 is shown in FIGS. 2-1 and 2-2. FIG. 2-1 is a cross-sectional view of another conventional liquid crystal display. And FIG. 2-2 is a top view of the conventional liquid crystal display as shown in FIG. 2-1. The first substrate 40 has a first electrode 41. The second substrate 60 has a plurality of second electrodes 62 each of which further has sub-electrodes 62' divided by the slit 62a. A third electrode 63 is disposed under the slit 62a so the liquid crystal molecules 51 of the liquid crystal layer 50 is always parallel to the first electrode 41. And the other liquid molecules 52 have an angle to the first electrode 41. The second electrode 62 and the third electrode 63 are disposed separately by insulating film 61.

Figure 3:
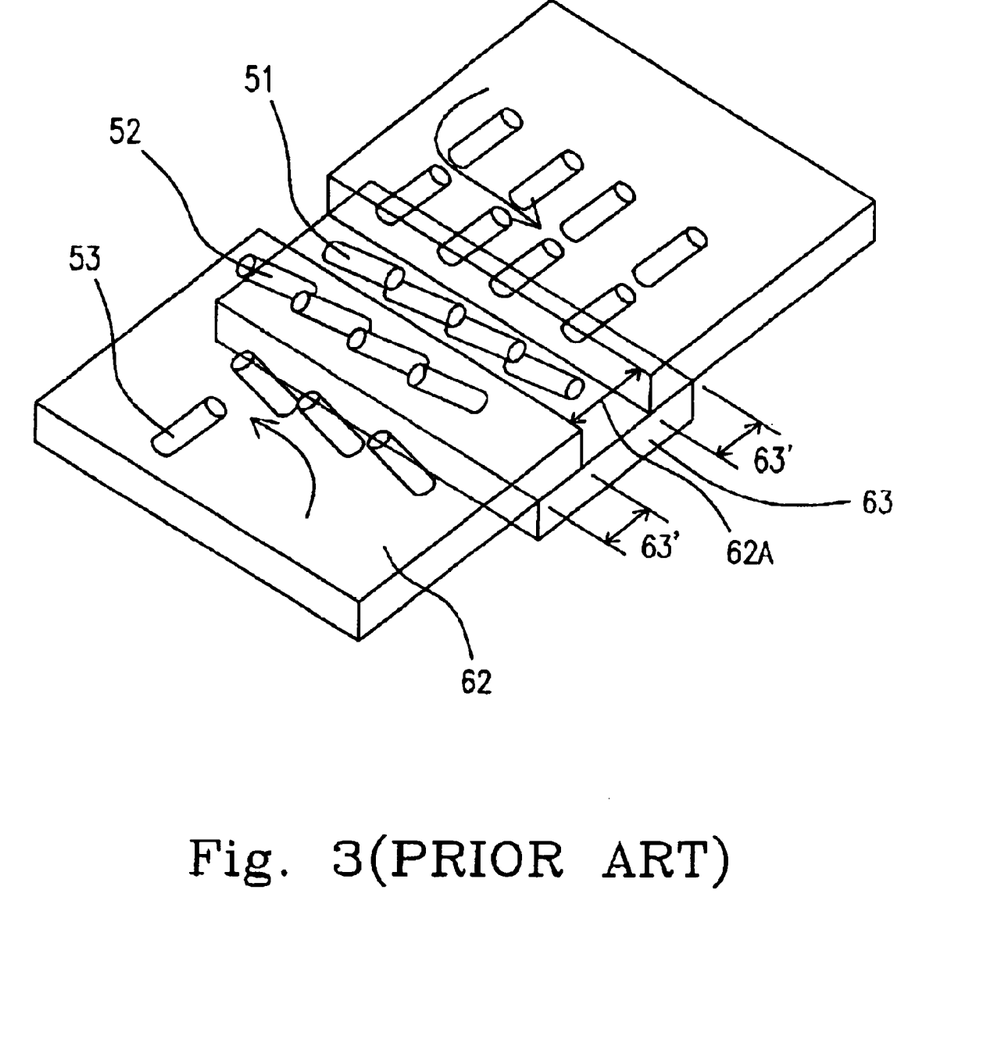
FIG. 3 is a perspective view of the structure of the second electrode and the third electrode shown in FIG. 2-1.

However, as shown in FIG. 3, the liquid crystal molecules 53 far from the third electrode 63 is pointed to the third electrode 63. But when an electric field is present across between the first and second substrates 40 and 60, the liquid crystal molecules 51 above the slit 62a are tilted and flow along the longitudinal direction of the third electrode 63 first, and after a period of time, the liquid crystal molecules 51 then rotate as the liquid crystal molecules 53. It causes the slow responding time.

Another problem is that the liquid crystal molecules 52 above the edge 63' of the third electrode 63 will rotate suddenly because of the electric field resulting from the overlapping of the second electrode 62 and third electrode 63. The unstable states of the liquid crystal molecules 52 not only cause the slow responding time but also cause the flicker of the liquid crystal display 4.

And yet another problem is that when the conventional liquid crystal display wants to increase the transmittance, the pixel voltage must be increased relatively. Generally speaking, the transmittance is raised while the pixel voltage is (of the sub-electrode 62') raised. Please refer to the FIG. 2-1. However, when the pixel voltage gets closing to the value of the bias voltage (of the third electrode 63), the transmittance gets going down because the liquid crystal molecules 55' rotate reversely and block the light which passes through the liquid crystal layer 50. In the FIG. 2-1, when the pixel voltage (of the sub-electrode 62') gets higher, because of the reverse area 55, the reversely rotating molecules 5' is created. Then the liquid crystal molecules 55' collide with the liquid crystal molecules 53' in the normal area 53 and then a colliding area 57 is created. Therefore, the transmittance of the conventional liquid crystal display are decreased by the colliding area 57. And the importance of controlling the voltage interval between the sub-electrode 62' and the third electrode 63 is also described below.

SUMMARY OF THE INVENTION

It is an object of the present invention to provide a liquid crystal display having a short responding time.

It is another object of the present invention to provide a liquid crystal with flicker-free. It is another object of the present invention to increase transmittance of a liquid crystal display.

According to one aspect of the present invention, a liquid crystal display includes a first substrate including a first electrode; a second substrate including thereon a second electrode having at least one elongate hole having a longitudinal direction and facing to the first electrode and said second electrode is supplied by a pixel voltage; a third electrode positioned under the at least one hole and between the second electrode and the second substrate and said third electrode is supplied by a bias voltage; and a liquid crystal layer including a plurality of liquid crystal molecules and interposed between the first substrate and the second substrate, wherein an interval between said pixel voltage and said bias voltage is for preventing said liquid crystal molecules rotating reversely.

In accordance with the present invention, the third electrode has at least one notch disposed on an edge thereof and a longitudinal direction perpendicular to the longitudinal direction of the elongate hole.

In accordance with the present invention, the second electrode is divided into the plurality of sub-electrodes by a plurality of slits. In accordance with the present invention, the second electrode further includes a plurality of gaps respectively aligned with the slit and pointed to the third electrode.

In accordance with the present invention, the liquid crystal molecules are negative dielectric anisotropy material.

In accordance with the present invention, the second substrate further comprises a switching element connected to said second electrode.

In accordance with the present invention, the third electrode is connected to an independent electrode.

In accordance with the present invention, the third electrode is electrically connected to a gate electrode.

In accordance with the present invention, the first electrode is made of a transparent material.

In accordance with the present invention, the second electrode is made of a transparent material.

In accordance with the present invention, the third electrode is made of an opaque material.

In accordance with the present invention, the second electrode is electrically connected to a switching element.

In accordance with the present invention, the interval between the second electrode and the third electrode is at least two volts. In accordance with the present invention, the first electrode is supplied by a common voltage.

In accordance with the present invention, while the pixel voltage is higher than the common voltage, the bias voltage is at least two volts larger than the pixel voltage.

In accordance with the present invention, while the pixel voltage is lower than the common voltage, the bias voltage is at least two volts smaller than the pixel voltage.

The foregoing and other features and advantages of the present invention will be more clearly understood through the following descriptions with reference to the drawings, wherein:

BRIEF DESCRIPTION OF DRAWINGS

FIG. 2-1 is a cross-sectional view of another conventional liquid crystal display;

FIG. 2-2 is a top view of the conventional liquid crystal display as shown in FIG. 2-1;

DETAILED DESCRIPTION OF THE PREFERRED EMBODIMENT

Figure 4:
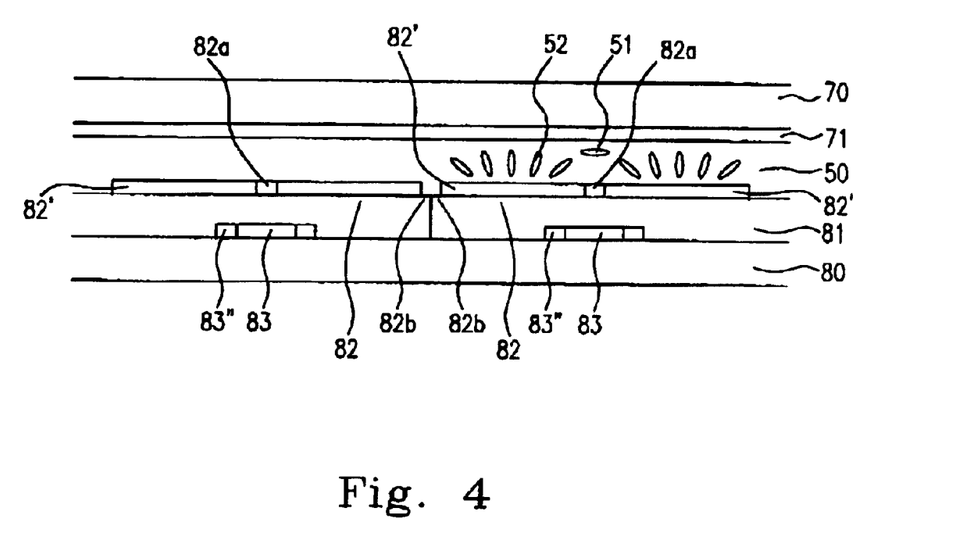
FIG. 4 is a cross-section view of a liquid crystal display according to a preferred embodiment of the present invention.
Figure 8:
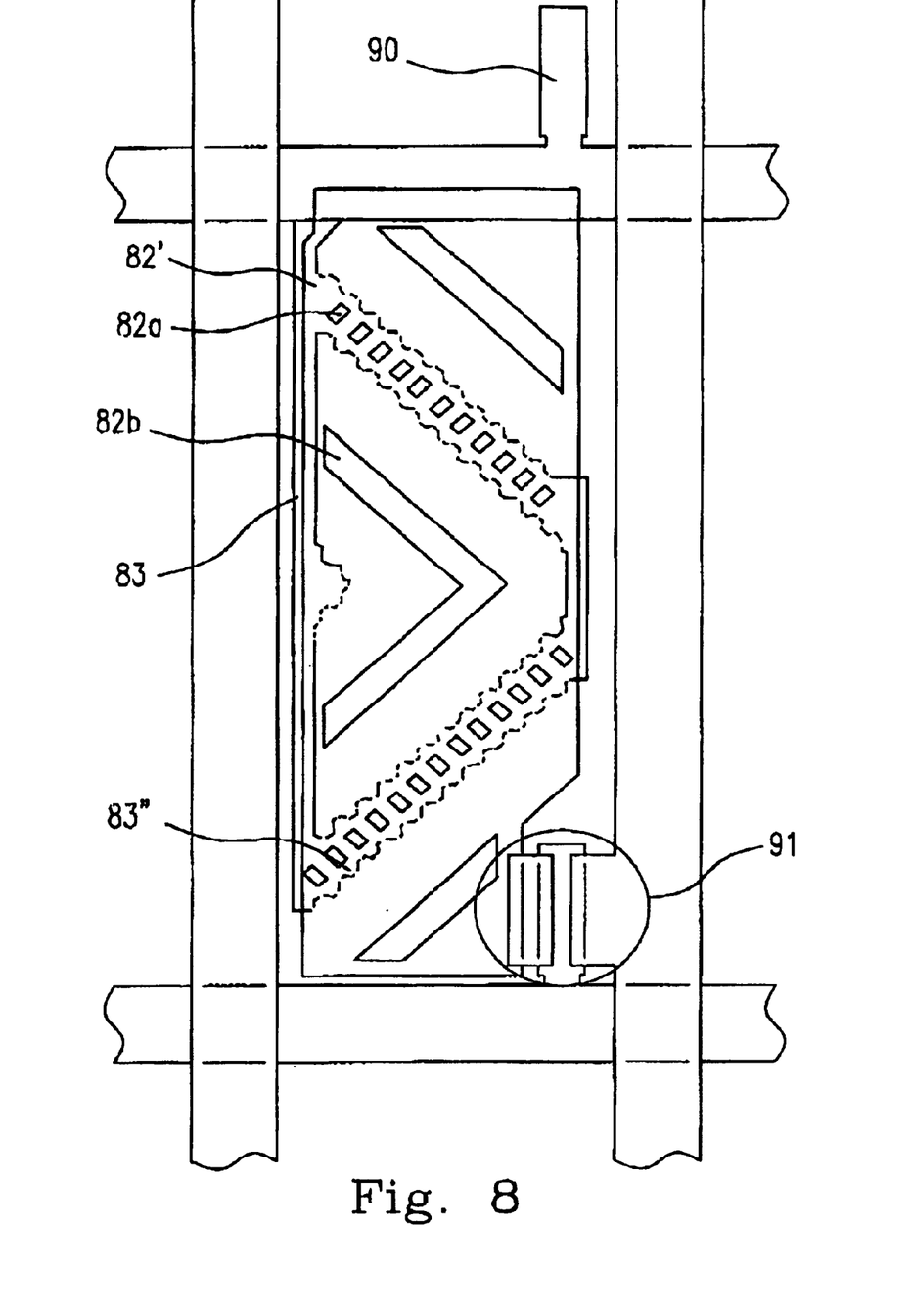
FIG. 8 is a top view of a second substrate according to a first embodiment of the present invention.

According to the FIG. 4, the cross-sectional view of the present invention is shown. The second electrode 82 has at least one hole 82a above the third electrode 83. The liquid crystal layer 50 is disposed between the first electrode 71 of the first substrate 70 and the second electrode 82 of the second substrate 80. The slit 82b divides the second electrode 82 into a plurality of sub-electrodes 82'. The edge 83' of the third electrode 83 is formed with at least one notch 83". The second electrode 82 and the third electrode 83 are separated by the insulating film 81, and the second electrode 82 is connected to the switching element 91 (FIG. 8).

Figure 5:
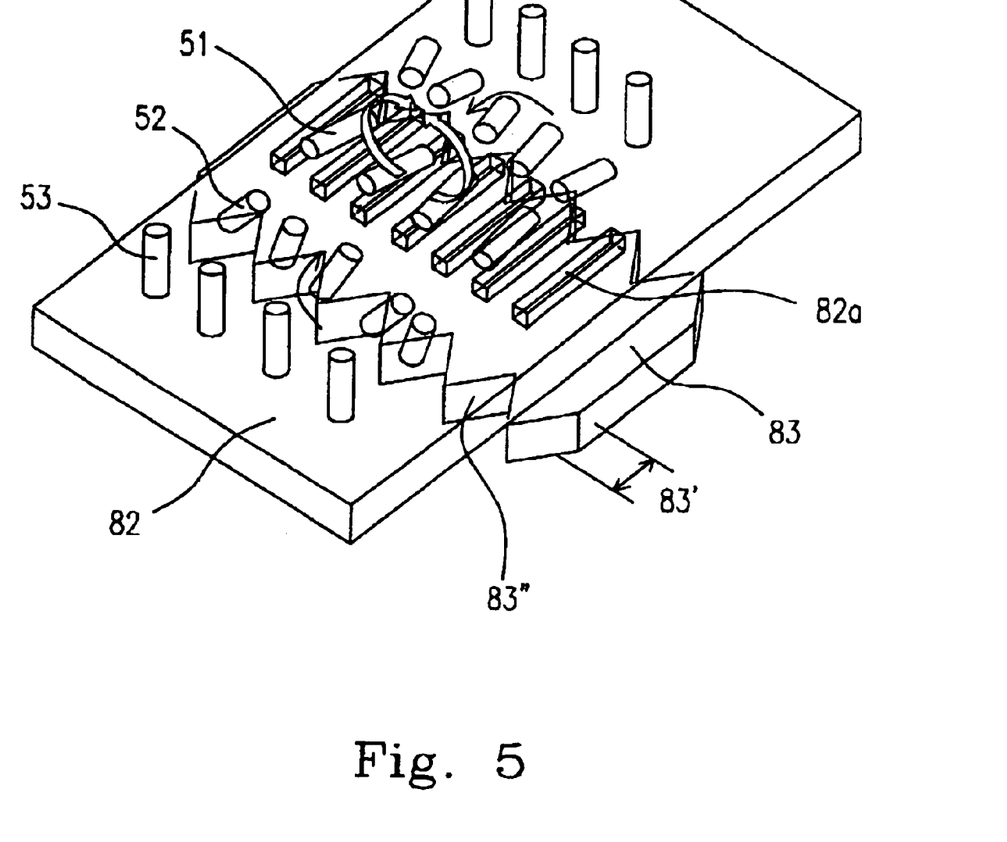
FIG. 5 is a perspective view of the structure of the second electrode and the third electrode shown in FIG. 4.

According to FIG. 5, the holes 82a is elongate, and under the existance of a sufficient electric field across the first and second substrates 70 and 80 (FIG. 4), the liquid crystal molecules 51 will tilt along the longitudinal direction of the hole 82a because of the fringe electric field. So the tilted direction of the liquid crystal molecules 51 is perpendicular to the longitudinal direction of the third electrode 83. The notch 83" also has a oblique electric field to push the liquid crystal molecules 52 to be pointed to the center above the third electrode 83, as same as the tilt direction of the liquid crystal molecules 53.

Figure 6:
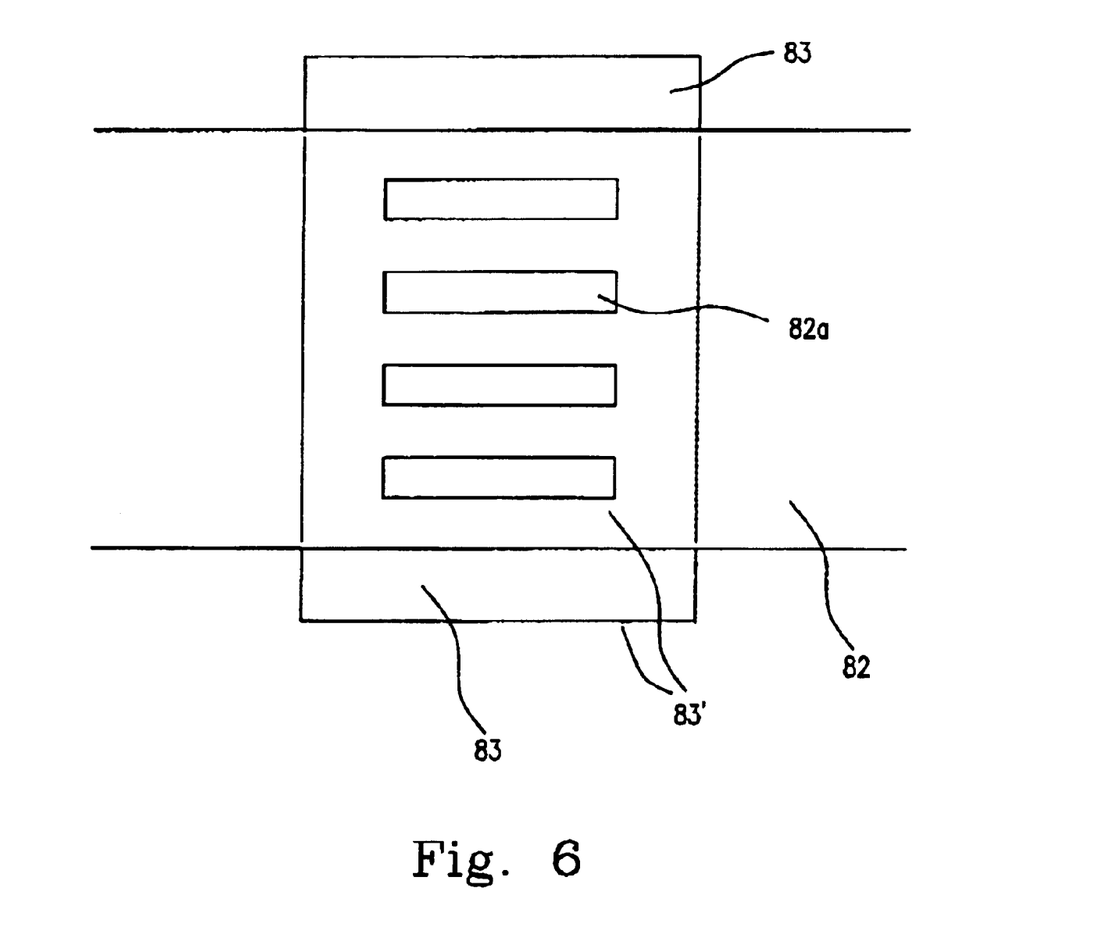
FIG. 6 is a top view of the structure of the second electrode and the third electrode according to a first embodiment of the present invention.

According to the FIG. 6, the second electrode 82 has a plurality of holes 82a above the third electrode 83 to create the fringe electric field, and to force the liquid crystal molecules 51 to tilt as shown in FIG. 5.

Figure 7:
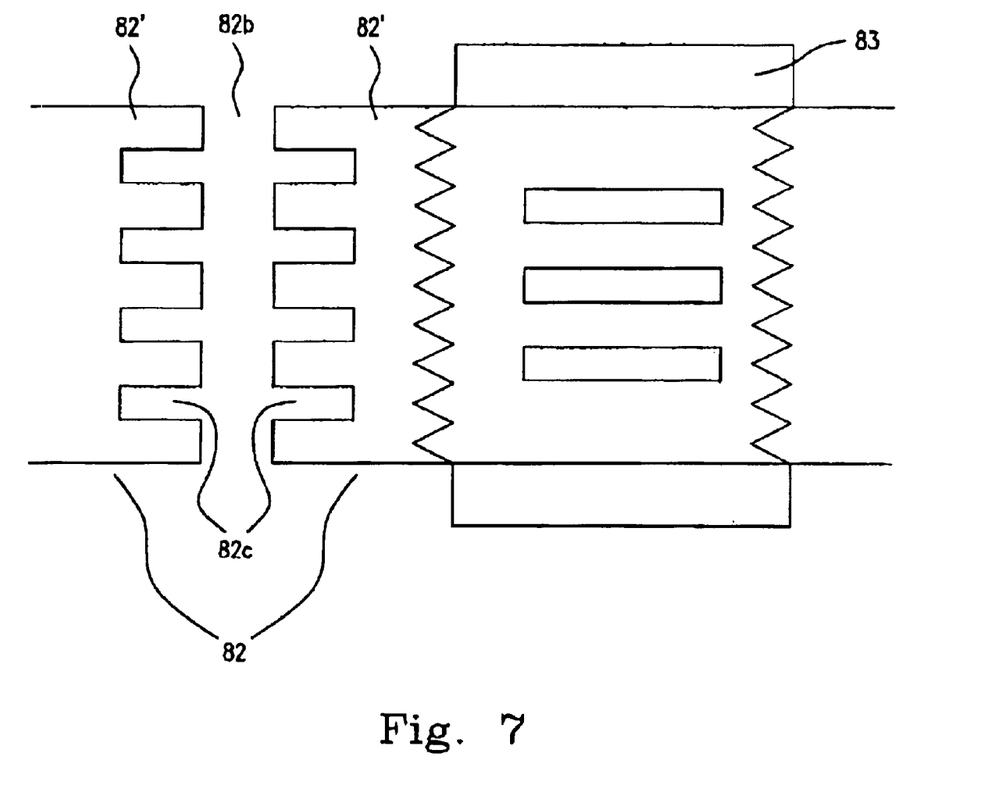
FIG. 7 is a top view showing the gap formed on the second electrode.

According to the FIG. 7, the sub-electrode 82' of the second electrode 82 also includes a plurality of gaps 82c respectively aligned with the slits 82b (FIG. 4) and pointed to the third electrode 83. The gaps 82c generate a fringe electric field to restrict the liquid crystal molecules in the liquid crystal layer 50 and make the molecules recovered to original arrangement easily when the liquid crystal molecule is disordered by an outer force.

FIG. 8 shows the top view of the substrate according to the first embodiment of the present invention in practice. The second electrode 82 is divided into several sub-electrodes 82' by the slit 82b. The third electrode 83 is disposed under the second electrode 82 and the holes 82a. The notch 83" is formed on the third electrode 83. The third electrode 83 is connected to the gate electrode 90, so the third electrode 83 will be activated simultaneously with the gate electrode 90. The second electrode 82 is connected to the switching element 91.

Figure 9:
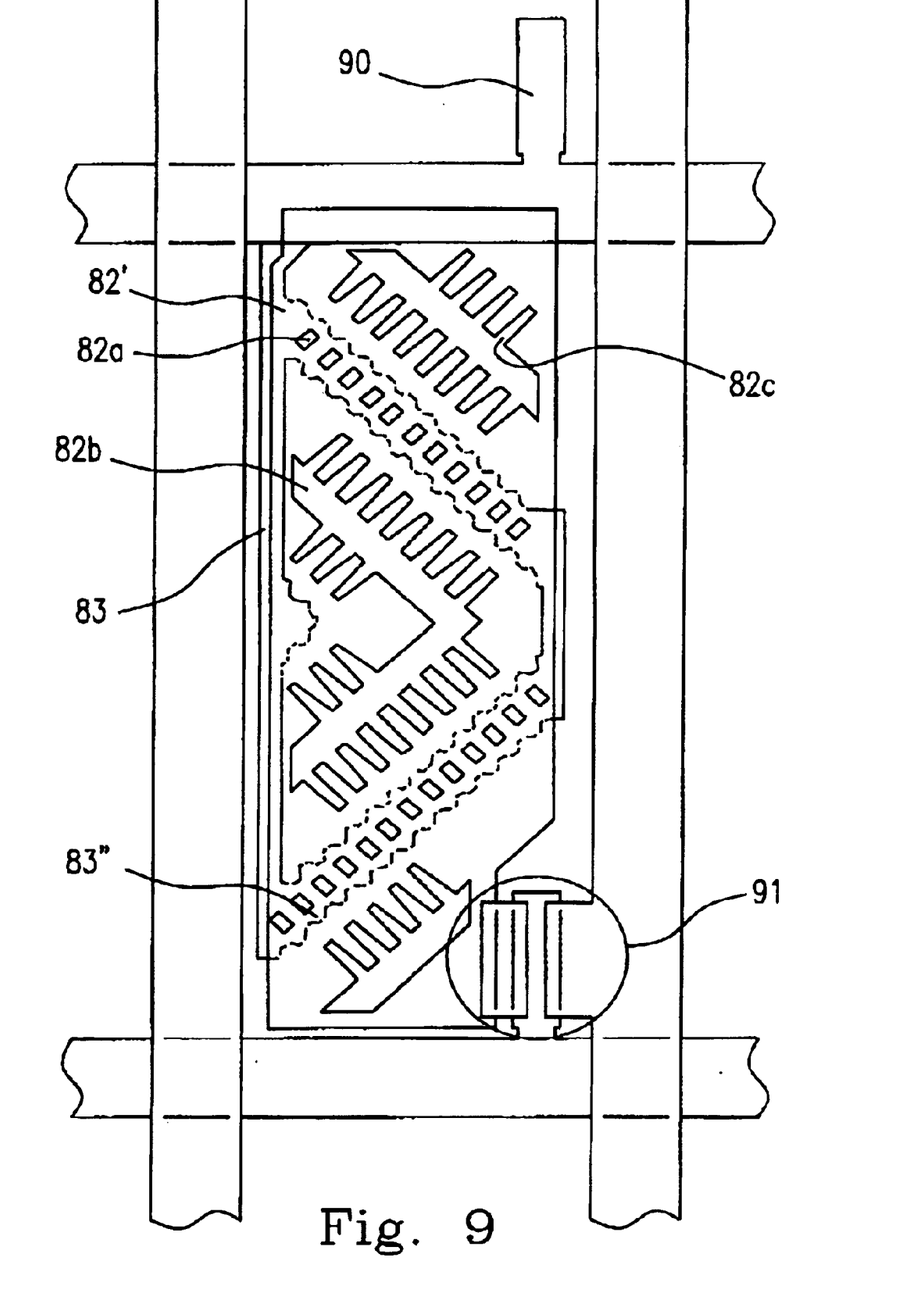
FIG. 9 is a top view of a second substrate according to a second embodiment of the present invention.

FIG. 9 shows another top view of the second substrate 80 (FIG. 4) according to the second embodiment of the present invention in practice. The third electrode 83 is electrically connected to the gate electrode 90. And the second electrode 82 further includes gaps 82c respectively aligned with the slits 82b. The second electrode 82 is connected to the switching element 91.

Figure 10:
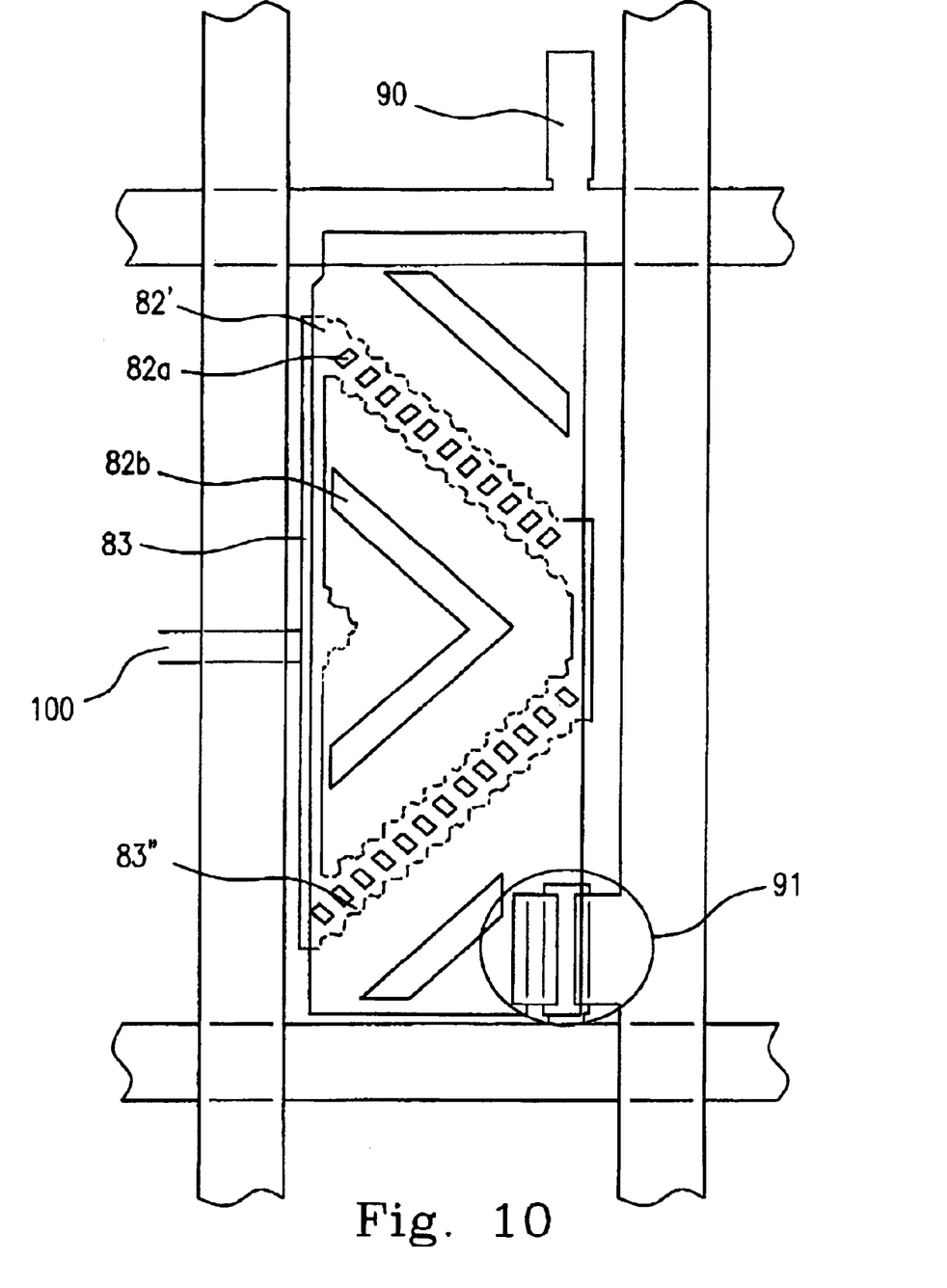
FIG. 10 is a top view of a second substrate according to a third embodiment of the present invention.

FIG. 10 shows a further top view of the second substrate 80 (FIG. 4) according to the third embodiment of the present invention in practice. The third electrode 83 is disposed under the second electrode 82 and the holes 82a. But the third electrode 83 is not connected with the gate electrode 90. The third electrode 83 is connected to the independent electrode 100, so the voltage of the third electrode 83 can be controlled independently and the gate signal delay time of the present invention will be decreased. The second electrode 82 is connected to the switching element 91.

Figure 11:
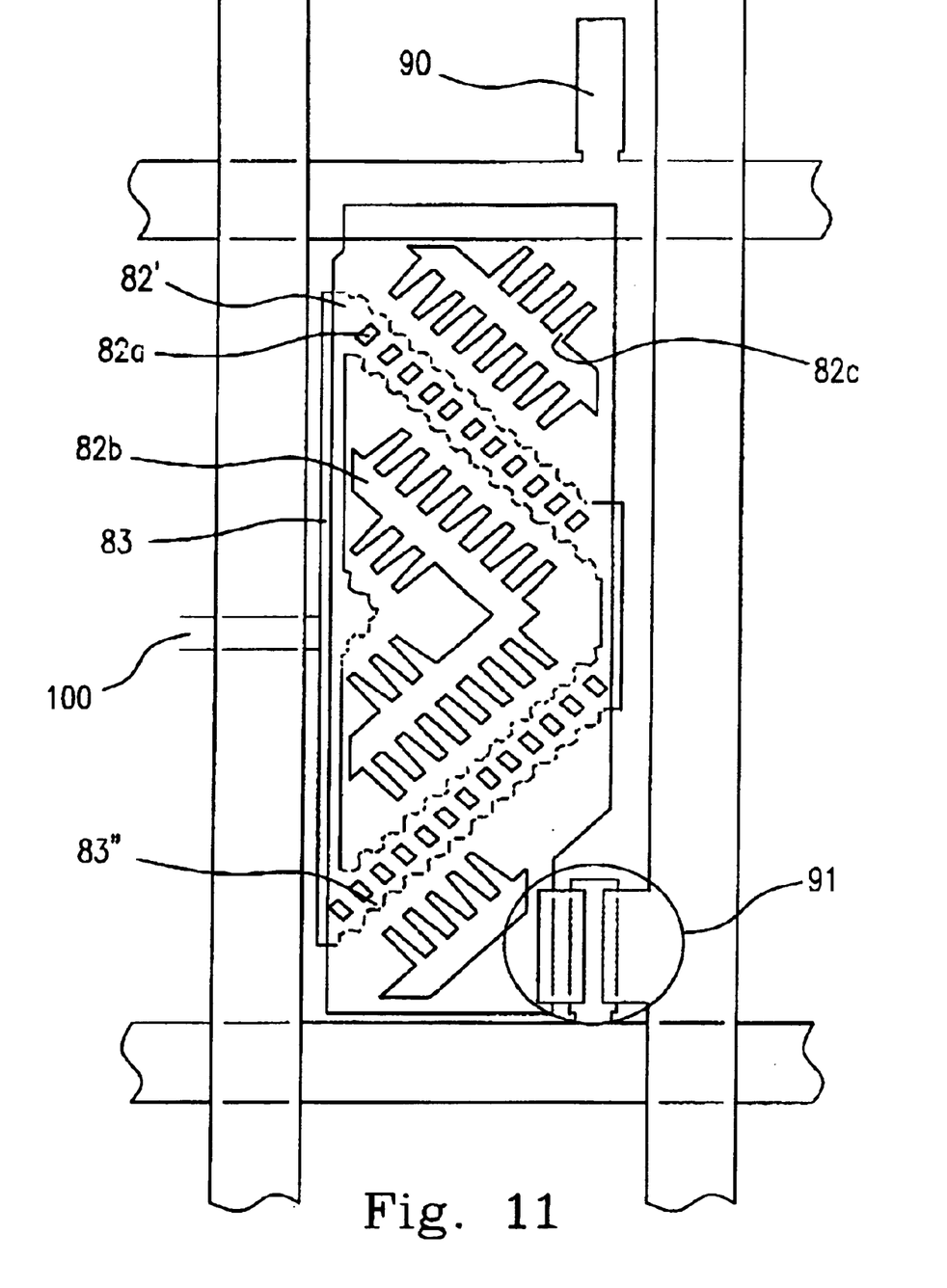
FIG. 11 is a top view of a second substrate according to a fourth embodiment of the present invention.

FIG. 11 shows further a top view of the second substrate according to the fourth embodiment of the present invention in practice. The third electrode 83 is disposed under the second electrode 82 and the holes 82a. But the third electrode 83 is not connected with the gate electrode 90. The second electrode 82 further includes the gaps 82c respectively aligned with the slits 82b. The third electrode 83 is connected to the independent electrode 100, so the voltage of the third electrode 83 can be controlled independently and the gate signal delay time of the present invention can be decreased. The second electrode 82 is connected to the switching element 91.

In order to raise the pixel voltages and maintain the light transmittance without dropping down, the present invention further defines that when the electric field thereof is positive, that is the voltage of the second electrode is higher than the voltage of the first electrode, the third electrode has a bias voltage being two volts higher than a pixel voltage of the sub-electrode. And when the electric field thereof is negative, that is the voltage of the second electrode is lower than the voltage of the first electrode the third electrode has a bias voltage being two volts lower than the pixel voltage of the sub-electrode.

Figure 12:
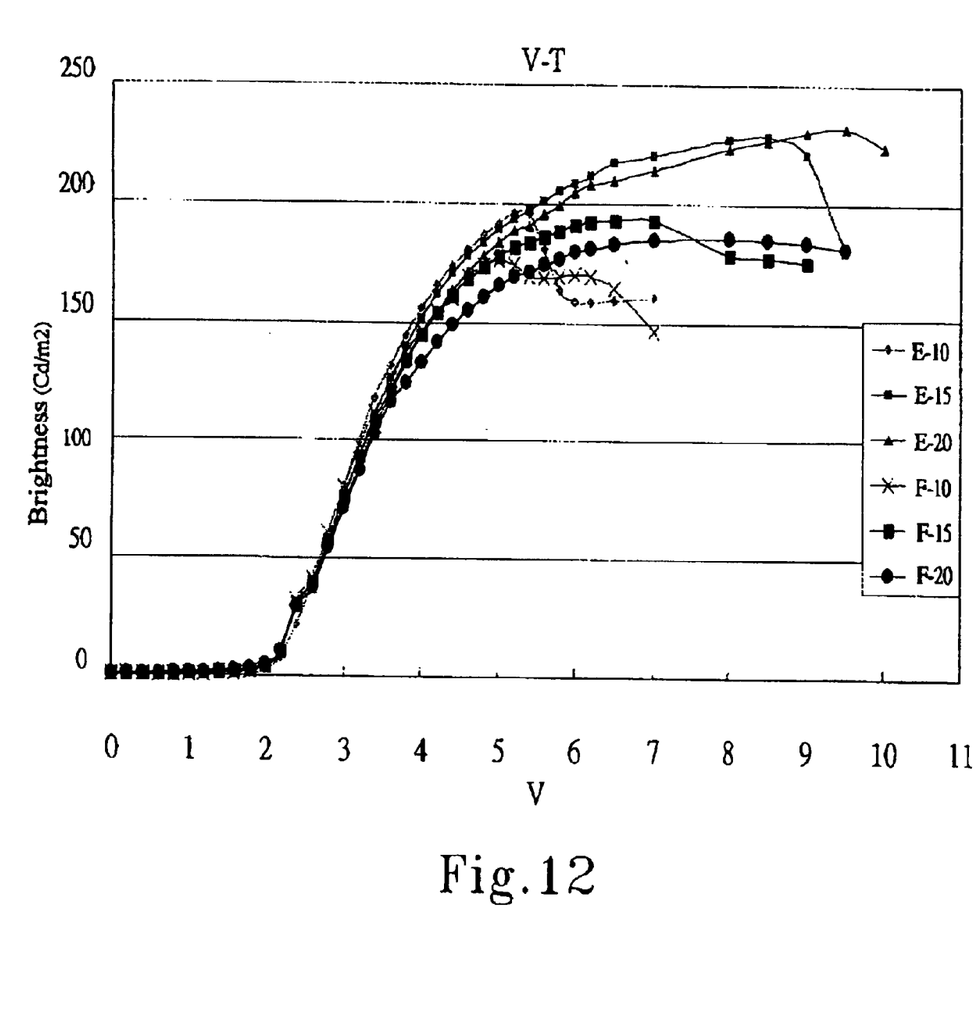
FIG. 12 is a chart showing the variation of brightness between the embodiment of FIG. 10 and the conventional liquid crystal display of FIG. 2-2.

Please refer to the FIG. 12, which is a chart showing the variation of transmittance base on the embodiment of FIG. 10 and the conventional liquid crystal display of FIG. 2-2, which is a top view of the liquid crystal display as shown in FIG. 2-1. The embodiment of the FIG. 10 has the third electrode 83 disposed under the holes 82a of the second electrode 82 and connected to the independent electrode 100. The conventional liquid crystal display 4 of FIG. 2-2 has a third electrode 63 disposed under the slit 62a. The embodiment of the FIG. 10 is called E-type LCD and the conventional LCD in the FIG. 2-2 is called F-type LCD. According to the line E-10 in FIG. 12, the bias voltage of the third electrode 83 of the E-type LCD is ten volts. The line F-10 of the F-type LCD indicates that the bias voltage of the third electrode 63 is ten volts. The voltage of the first electrode (41 in FIG. 2-1 and 71 in FIG. 4) of both F-type LCD and E-type LCD is kept at zero volt. Therefore, referring to the FIG. 12, it is clear that the light transmittance is decreased when the pixel voltage of the sub-electrode 82' is over five volts and when the pixel voltage of the sub-electrode 62' is over 4.5 volts. When both of the third electrode 83 and 63 are supplied by fifteen volts shown by lines E-15 and F-15, the transmittance of the E-type LCD is increased until the voltage of the sub-electrode 82' is increased over than 8.5 volts. But, the transmittance of the F-type LCD is dropped when the pixel voltage of the sub-electrode 62' is increased over than 7 volts because of the liquid crystal molecules rotating reversely. Therefore, when the third electrode 83 and 63 are both supplied by fifteen volts, and the pixel voltage is over 8.5 volts, the liquid crystal molecules of the E-type LCD rotating reversely. And when the third electrode 83 of the E-type LCD is supplied by twenty volts, the pixel voltage can be raised as around 9.5 volts that the transmittance will not drop in the embodiment. Nevertheless, according to the F-type LCD of FIG. 2-2, when the pixel voltage is over eight volts, the transmittance thereof will be dropped. Therefore, to maintain the voltage of the third electrode higher than that of the sub-electrode within a proper interval for preventing the liquid crystal molecules rotating reversely is very important. Further, in the FIG. 12, it is clear that the proper voltage interval between the third electrode and the sub-electrode of the E-type LCD is narrower than that of the F-type LCD. Therefore, comparing to the conventional LCD in FIG. 2-2, the LCD in FIG. 10 of the present invention can effectively improve the problem about the reversely rotation of the liquid crystal molecules.

Figure 13:
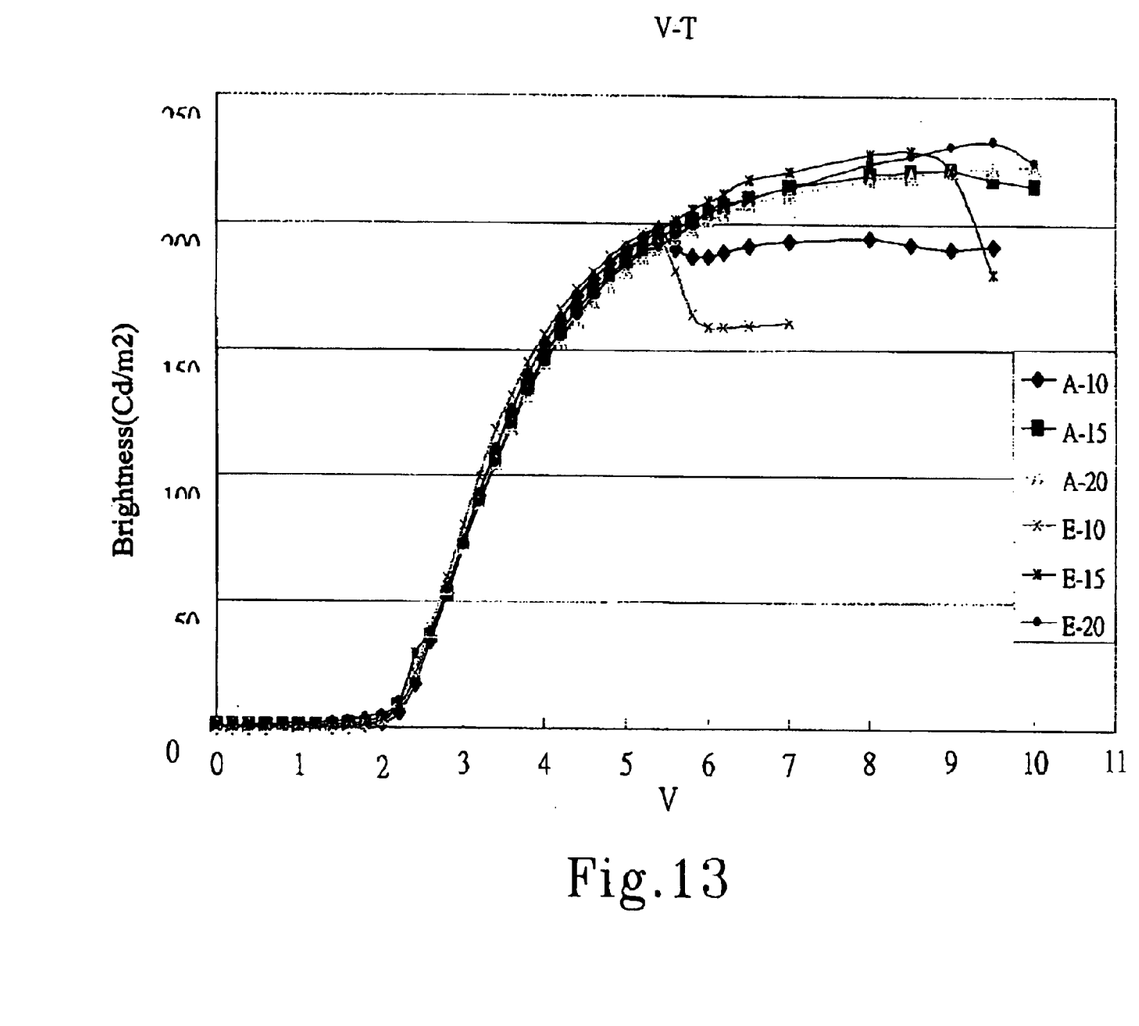
FIG. 13 is a chart showing the variation of brightness according to the embodiment of FIG. 10 and the embodiment of FIG. 11.
Figure 14:
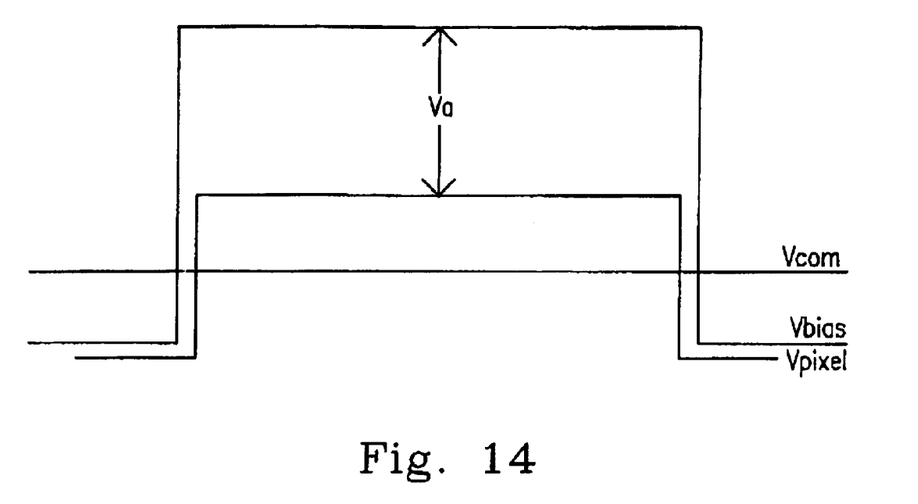
FIG. 14 shows a voltage difference between bias voltage and pixel voltage when the liquid crystal display is in a positive electric field.
Figure 15:
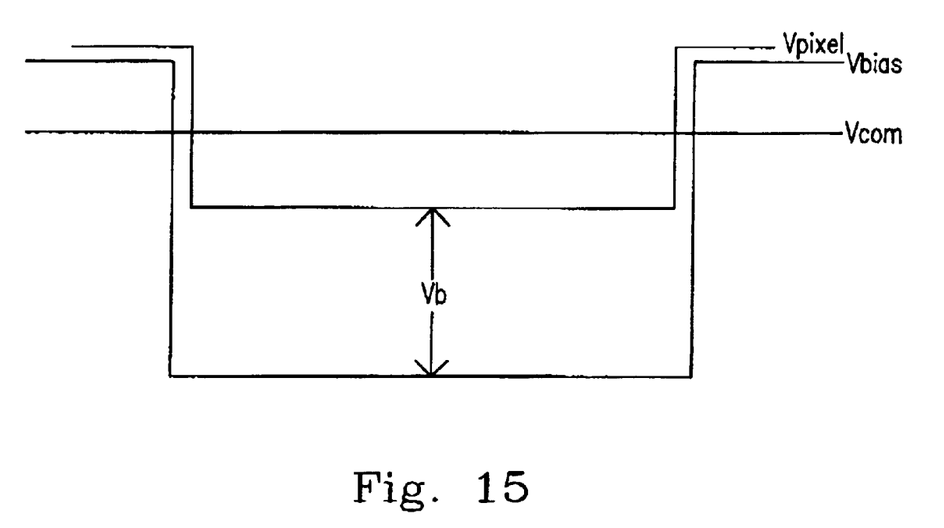
FIG. 15 shows a voltage difference between bias voltage and pixel voltage when the liquid crystal display is in a negative electric field.

Please refer to the FIG. 13, which is a chart showing the variation of transmittance in the A-type LCD of the FIG. 11 and the E-type LCD of the FIG. 10. Both embodiments of the FIGS. 11 and 10 have the third electrode 83 disposed under the holes 82a of the second electrode 82 and connected to the independent electrode 100. But the second electrode 82 of A-type LCD of the FIG. 11 further has gap 82c respectively aligned with the slits 82b. The voltage of the first electrode (71 as shown in FIG. 4) of both A-type LCD and E-type LCD is kept at zero volt. The line E-10 shows that if the third electrode 83 of the E-type LCD is supplied by ten volts, the transmittance will drop when the pixel voltage is over 5 volts. And the line A-10 shows when the third electrode 83 of the A-type LCD is supplied by ten volts, the transmittance will drop due to liquid crystal molecules rotating reversely when the pixel voltage is over eight volts. The line E-15 indicates that the third electrode 83 of the F-type LCD is supplied by fifteen volts. The line A-15 indicates that the third electrode 83 of the A-type LCD is supplied by fifteen volts. Referring to lines E-15 and A-15, when the pixel voltage of the sub-electrode 82' of E-type LCD is over 8.5 volts, the transmittance begins to drop. Similary, the transmittance of A-type LCD does not drop until the pixel voltage is over 9 volts. The lines E-20 and A-20 indicate that the third electrodes 83 of the E-type LCD and the A-type LCD are both supplied by 20 volts. According to the line E-20, when the pixel voltage is over 9.5 volts, the transmittance drops. And the line A-20 shows that although the pixel voltage increase to ten volts, the liquid crystal molecules of the A-type LCD will not rotate reversely. Certainly, to maintain the voltage of the third electrode higher than that of the sub-electrode in a proper interval is still very important. Furthermore, from FIG. 13, it is clear that the proper voltage interval between the third electrode and the sub-electrode of the A-type LCD is smaller than that of the E-type LCD. So, comparing to the first embodiment of the electrodes of FIG. 10, the second embodiment in FIG. 11 of the present invention can fiber improve the liquid crystal molecules rotating reversely. No matter to the first embodiment of E-type LCD or A-type LCD, the bias voltage applied on the third electrode must higher than the pixel voltage of the sub-electrode in a proper interval to prevent the liquid crystal molecules rotating reversely. Therefore, according to FIG. 14, when the electrical field is positive, the bias voltage Vbias, which is applied to the third electrode, must higher than the pixel voltage Vpixel, which is applied to the second electrode, an interval Va, and the interval Va is at least two volts. Base on the same reason, according to FIG. 15, when the electrical field is negative, the bias voltage Vbias, which is applied to the third electrode, must lower than the pixel voltage Vpixel, which is applied to the second electrode, an interval Vb, and the interval Vb is at least two volts. Furthermore, the common voltage Vcom, which is applied to the first electrode, is kept at a predetermined voltage.

While the invention has been described in terms of what are presently considered to be the most practical and preferred embodiments, it is to be understood that the invention needs not be limited to the disclosed embodiment. On contrary, it is intended to cover various modifications and similar arrangements included within the spirit and scope of the appended claims which are to be accorded with the broadest interpretation so as to encompass all such modifications and similar structures.

What is claimed is:

1. A liquid crystal display comprising:
   a first substrate comprising a first electrode;
   a second substrate comprising thereon a second electrode having at least one elongate hole having a longitudinal direction and facing to said first electrode and said second electrode is supplied by a pixel voltage;
   a third electrode positioned under said at least one hole and between said second electrode and said second substrate and said third electrode is supplied by a bias voltage; and
   a liquid crystal layer comprising a plurality of liquid crystal molecules and interposed between said first substrate and said second substrate,
   wherein an interval being at least two volts between said pixel voltage and said bias voltage is for preventing said liquid crystal molecules rotating reversely.

2. The liquid crystal display of claim 1, wherein said third electrode has at least one notch disposed on an edge thereof and a longitudinal direction perpendicular to said longitudinal direction of said elongate hole.

3. The liquid crystal display of claim 1, wherein said second electrode is divided into a plurality of sub-electrodes by a plurality of slits.

4. The liquid crystal display of claim 3, wherein said second electrode further comprises a plurality of gaps respectively aligned with said slit and pointed to said third electrode.

5. The liquid crystal display of claim 1, wherein said liquid crystal molecules are negative dielectric anisotropy material.

6. The liquid crystal display of claim 1, wherein said second substrate further comprises a switching element connected to said second electrode.

7. The liquid crystal display of claim 1, wherein said third electrode is connected to an independent electrode.

8. The liquid crystal display of claim 1, wherein said third electrode is electrically connected to a gate electrode.

9. The liquid crystal display of claim 1, wherein said first electrode is made of a transparent material.

10. The liquid crystal display of claim 1, wherein said second electrode is made of a transparent material.

11. The liquid crystal display of claim 1, wherein said third electrode is made of an opaque material.

12. The liquid crystal display of claim 1, wherein said second electrode is electrically connected to a switching element.

13. The liquid crystal display of claim 1, wherein said liquid crystal display is applied by a positive electric field, said bias voltage is at least two volts higher than said pixel voltage.

14. The liquid crystal display of claim 1, wherein said liquid crystal display is applied by a negative electric field, said bias voltage is at least two volts lower than said pixel voltage.

15. The liquid crystal display of claim 1, wherein said first electrode is biased by a common voltage.

* * * * *